US009981716B2

(12) United States Patent
Suzuki et al.

(10) Patent No.: US 9,981,716 B2
(45) Date of Patent: May 29, 2018

(54) DRIVE UNIT AND ELECTRIC-MOTOR-ASSISTED BICYCLE

(71) Applicant: YAMAHA HATSUDOKI KABUSHIKI KAISHA, Iwata-shi, Shizuoka (JP)

(72) Inventors: Ryota Suzuki, Shizuoka (JP); Yasunori Mano, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 0 days. days.

(21) Appl. No.: 15/453,971

(22) Filed: Mar. 9, 2017

(65) Prior Publication Data

US 2017/0313382 A1    Nov. 2, 2017

(30) Foreign Application Priority Data

Apr. 28, 2016    (JP) .................................. 2016-091468

(51) Int. Cl.
*B62M 6/40*    (2010.01)
*B62M 6/55*    (2010.01)
(Continued)

(52) U.S. Cl.
CPC ............... *B62M 6/55* (2013.01); *B62M 9/10* (2013.01); *B62M 11/02* (2013.01); *F16C 17/04* (2013.01);
(Continued)

(58) Field of Classification Search
CPC . B62M 6/40; B62M 6/55; B62M 9/10; B62M 11/04; F16H 1/20; F16H 37/065
See application file for complete search history.

(56) References Cited

U.S. PATENT DOCUMENTS 5,749,429 A * 5/1998 Yamauchi ................ B62M 6/45
                                                        180/206.2
5,758,736 A * 6/1998 Yamauchi ................ B62M 6/45
                                                        180/206.4
(Continued)

FOREIGN PATENT DOCUMENTS

EP    0 736 449 A2    10/1996
EP    2 381 566 A2    10/2011
(Continued)

*Primary Examiner* — Kevin Hurley
*Assistant Examiner* — Michael R Stabley
(74) *Attorney, Agent, or Firm* — Keating and Bennett, LLP

(57) ABSTRACT

In an electric-motor-assisted bicycle, a motor includes a motor output shaft including a helical gear provided thereon. A reduction gear includes a rotatable shaft and a cylindrical portion. The rotatable shaft extends through the cylindrical portion. A helical gear provided on the cylindrical portion engages the helical gear on the motor output shaft. The rotatable shaft includes a first large-diameter portion, a small-diameter portion and a second large-diameter portion. The reduction gear further includes a bush bearing between an end surface of the first large-diameter portion and an end surface of the second large-diameter portion in the axial direction of the rotatable shaft. The outer periphery of the bush bearing is fixed to the cylindrical portion. The inner periphery of the bush bearing slides in a circumferential direction relative to the small-diameter portion. The bush bearing moves in the axial direction.

6 Claims, 9 Drawing Sheets

(51) Int. Cl.
*B62M 9/10* (2006.01)
*B62M 11/02* (2006.01)
*F16H 1/20* (2006.01)
*F16H 37/06* (2006.01)
*F16C 17/04* (2006.01)
*B62M 6/50* (2010.01)
*B62M 6/90* (2010.01)

(52) U.S. Cl.
CPC ............. *F16H 1/20* (2013.01); *F16H 37/065* (2013.01); *B62M 6/50* (2013.01); *B62M 6/90* (2013.01)

(56) References Cited

U.S. PATENT DOCUMENTS

| | | | | |
|---|---|---|---|---|
| 6,012,538 | A * | 1/2000 | Sonobe | B62M 6/45 180/206.3 |
| 6,073,717 | A * | 6/2000 | Yamamoto | B62M 6/45 180/206.4 |
| 6,080,073 | A * | 6/2000 | Liu | B62M 6/55 180/206.1 |
| 8,652,000 | B2 * | 2/2014 | Wang | B62M 6/55 477/5 |
| 8,684,122 | B2 * | 4/2014 | Maeno | B62M 6/55 180/205.1 |
| 8,777,791 | B1 * | 7/2014 | Hino | B62M 6/55 180/206.4 |
| 9,017,201 | B2 * | 4/2015 | Hino | B62M 11/04 475/5 |
| 9,758,213 | B2 * | 9/2017 | Kawakami | B62M 6/50 |
| 2011/0195813 | A1 * | 8/2011 | Yoo | B62M 11/16 475/270 |
| 2014/0051548 | A1 * | 2/2014 | Hino | B62M 6/55 477/15 |
| 2014/0121049 | A1 * | 5/2014 | Nishikawa | B62M 6/55 474/148 |
| 2014/0166384 | A1 * | 6/2014 | Ishida | B62M 6/50 180/206.3 |
| 2016/0107721 | A1 * | 4/2016 | Urabe | B62M 6/55 475/4 |
| 2016/0280321 | A1 * | 9/2016 | Yamamoto | F16H 3/083 |
| 2016/0280328 | A1 * | 9/2016 | Yamamoto | B62M 11/14 |
| 2016/0288872 | A1 * | 10/2016 | Shahana | B62M 6/55 |

FOREIGN PATENT DOCUMENTS

| | | |
|---|---|---|
| EP | 2 743 168 A1 | 6/2014 |
| EP | 2 783 972 A1 | 10/2014 |
| JP | 2014-196080 A | 10/2014 |

* cited by examiner

DRIVE UNIT AND ELECTRIC-MOTOR-ASSISTED BICYCLE

CROSS REFERENCE TO RELATED APPLICATIONS

This application claims the benefit of priority to Japanese Patent Application No. 2016-091468 filed on Apr. 28, 2016. The entire contents of this application are hereby incorporated herein by reference.

BACKGROUND OF THE INVENTION

1. Field of the Invention

The present invention relates to a drive unit and an electric-motor-assisted bicycle, and more particularly to a drive unit attached to a vehicle-body frame included in an electric-motor-assisted bicycle and an electric-motor-assisted bicycle including such a drive unit.

2. Description of the Related Art

Bicycles are used by many people, regardless of age and gender, as a handy transportation means. In recent years, electric-motor-assisted bicycles that add driving forces from the motor to pedaling forces from the rider to assist the rider have become popular. Such an electric-motor-assisted bicycle is disclosed in JP 2014-196080 A, for example.

The above publication describes an electric-motor-assisted bicycle that includes a drive unit. The drive unit includes a crank axle. Pedals are mounted on the crank axle by means of crank arms. The drive unit is attached to the bottom of the vehicle-body frame.

The drive unit is a component that was not present in conventional bicycles. Consequently, in the context of bicycles where importance is given to travelling performance, such as racing bicycles, the drive unit may present an obstacle and decrease travelling performance. More specifically, Q Factor may increase. Q Factor is the distance between the outer surfaces (i.e., sides located outward in the axial direction of the crank axle) of the pedal attachment portions of the left and right crank arms attached to the crank axle (i.e., distance measured in the axial direction of the crank axle).

SUMMARY OF THE INVENTION

Preferred embodiments of the present invention reduce Q Factor.

A drive unit according to a preferred embodiment of the present invention is attached to a vehicle-body frame of an electric-motor-assisted bicycle and generates a driving force to be transmitted to a rear wheel. The drive unit includes a housing, a motor, a crank axle, a crank rotation input shaft, a resultant-force output shaft, and a reduction gear. The motor is housed in the housing. The motor includes a motor output shaft. The motor output shaft includes a helical gear provided thereon. The crank axle extends through the housing in a left-to-right direction with respect to the bicycle. The crank axle extends through the crank rotation input shaft. One end of the crank rotation input shaft is coupled to the crank axle. The crank axle extends through extends through the resultant-force output shaft. The resultant-force output shaft is connected to the other end of the crank rotation input shaft with a one-way clutch provided in between. The reduction gear is housed in the housing. The reduction gear transmits the driving force from the motor to the resultant-force output shaft. The reduction gear includes a rotatable shaft, a cylindrical portion, and a one-way clutch. The rotatable shaft is positioned to be parallel or substantially parallel to the crank axle. The rotatable shaft includes a driving gear. The driving gear engages a driven gear included in the resultant-force output shaft. The rotatable shaft extends through the cylindrical portion. The cylindrical portion includes a helical gear provided thereon. This helical gear engages the helical gear on the motor output shaft. The one-way clutch is located between the rotatable shaft and the cylindrical portion in a radial direction of the rotatable shaft. The rotatable shaft includes a first large-diameter portion, a small-diameter portion, and a second large-diameter portion. The driving gear is provided on the first large-diameter portion. The small-diameter portion has a smaller diameter than the first large-diameter portion. The small-diameter portion is connected to the first large-diameter portion such that these portions are arranged in an axial direction of the rotatable shaft. The second large-diameter portion has a larger diameter than the small-diameter portion. The second large-diameter portion is connected to the small-diameter portion such that these portions are arranged in the axial direction of the rotatable shaft. The reduction gear further includes a bush bearing. The bush bearing is disposed between the first large-diameter portion and the second large-diameter portion in the axial direction of the rotatable shaft. The outer periphery of the bush bearing is fixed to the cylindrical portion. The inner periphery of the bush bearing is able to slide in a circumferential direction relative to the small-diameter portion. The bush bearing is able to move in the axial direction.

The above-described drive unit reduces Q Factor.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
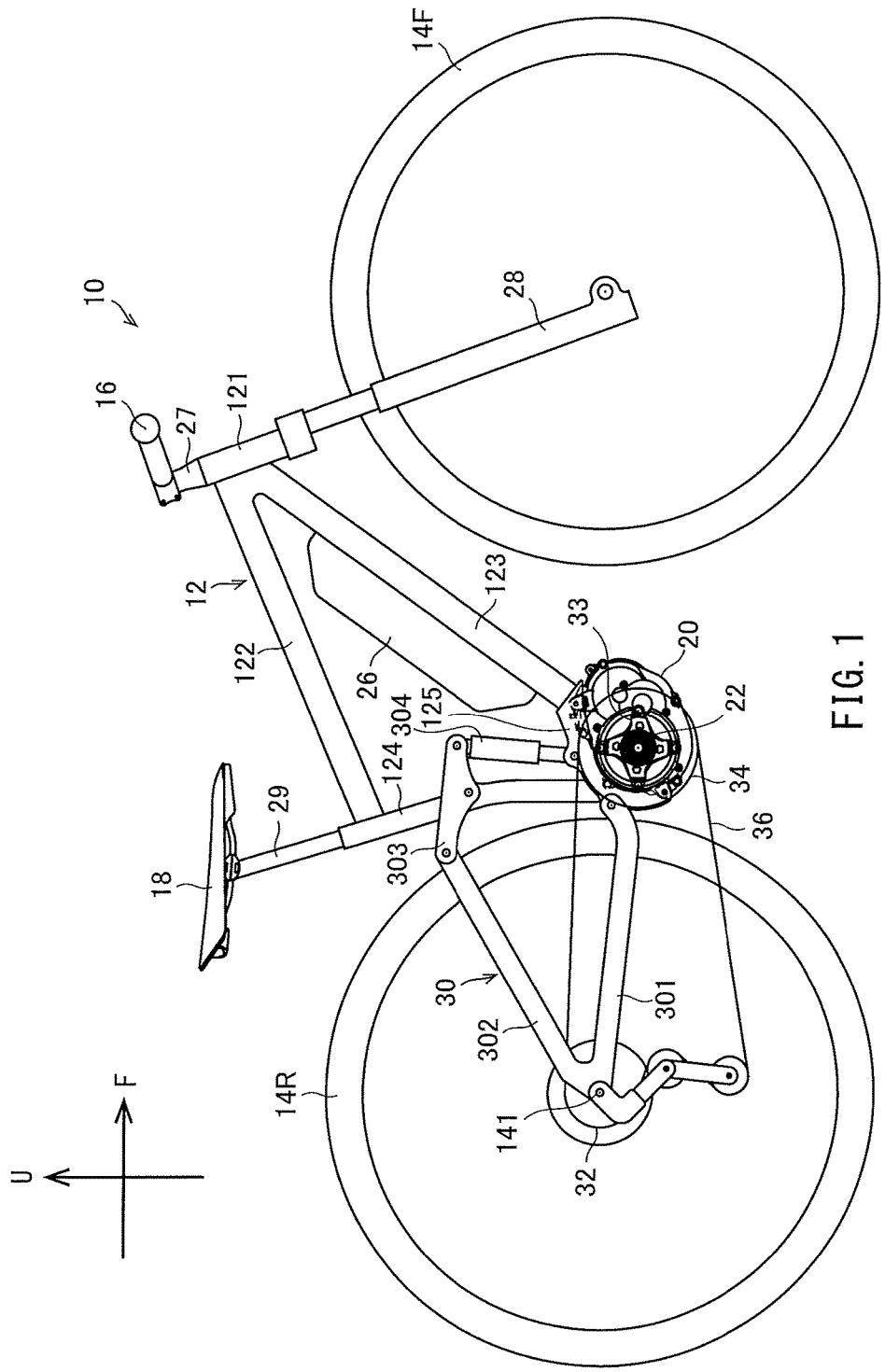
FIG. 1 is a right-side view of an electric-motor-assisted bicycle according to a preferred embodiment of the present invention.

The present inventors conducted research to find a way to reduce the Q Factor of an electric-motor-assisted bicycle with a drive unit attached to the vehicle-body frame. The inventors reached the following findings.

As discussed above, Q Factor is the distance between the outer sides of the pedal attachment portions of the left and right crank arms attached to the crank axle. The inventors focused on reducing the length of the crank axle to reduce Q Factor.

In an electric-motor-assisted bicycle with a drive unit attached to the vehicle-body frame, the crank axle extends through the housing of the drive unit in the left-to-right direction with respect to the vehicle. Therefore, reducing the dimension of the housing as measured in the left-to-right direction with respect to the vehicle (i.e., axial direction of the crank axle) makes it possible to reduce the length of the crank axle. To reduce the dimension of the housing as measured in the axial direction of the crank axle, it should be considered what structural elements should be housed in the housing and how they should be arranged.

A crank rotation input shaft and resultant-force output shaft are positioned within the housing, preferably. The crank axle extends through the crank rotation input shaft. The crank rotation input shaft rotates together with the crank axle. The crank axle extends through the resultant-force output shaft. The resultant-force output shaft is connected to the crank rotation input shaft with a one-way clutch provided in between.

The drive unit generates driving forces to be transmitted to the rear wheel, for example. Thus, a motor and a reduction gear that transmit driving forces from the motor to the resultant-force output shaft are positioned within the housing.

As discussed above, the crank axle extends through the housing. Thus, the motor and reduction gear are located near the crank axle. If the motor and reduction gear are located at the same position in the axial direction of the crank axle, the dimension of the housing as measured along the axial direction of the crank axle is able to be reduced.

Driving forces from the motor are able to be transmitted to the reduction gear via a gear. Further, the output shaft of the motor and the rotatable shaft of the reduction gear are positioned to be parallel or substantially parallel to the crank axle. Thus, to enable the gear of the output shaft of the motor to engage the reduction gear, the reduction gear is displaced from the motor in an axial direction of the crank axle. As such, it is not realistic to position the motor and reduction gear at the same position in the axial direction of the crank axle.

In view of this, the present inventors arrived at the idea that reducing the axial dimension of the reduction gear would enable the ability to reduce the dimension of the housing as measured in the axial direction of the crank axle. Then, the present inventors did extended research into the construction of a reduction gear.

According to JP 2014-196080A, the reduction gear includes a first gear engaging the gear of the output shaft of the motor and a second gear engaging the gear of the resultant-force output shaft. A driving force from the motor is transmitted to the reduction gear. That is, as the output shaft of the motor rotates, the reduction gear rotates. As such, when the reduction gear rotates, the output shaft of the motor also rotates. As a result, when the bicycle tread uses the tread force of the rider only, not only does the reduction gear rotate, the output shaft of the motor also rotates. This increases the burden on the rider when pedaling. In view of this, a one-way clutch is provided on the reduction gear. More specifically, a one-way clutch is provided between a cylindrical portion including the first gear provided on its outer periphery and a rotatable shaft inserted through this cylindrical portion and including the second gear provided on its outer periphery.

To reduce the sound produced when the gear on the output shaft of the motor is engaging the first gear on the reduction gear, the first gear may be made of a synthetic resin. In this case, to ensure durability, the gear on the output shaft of the motor and the first gear on the reduction gear may be helical gears. However, if the gear on the output shaft of the motor and the first gear on the reduction gear are helical gears, rotation of the reduction gear due to a driving force from the motor produces a thrust force. As a result, the cylindrical portion attempts to move in an axial direction relative to the rotatable shaft (shaft portion). In view of this, in the reduction gear of JP 2014-196080 A, a pair of washers separated in the axial direction of the reduction gear are used to limit movement of the cylindrical portion in an axial direction relative to the shaft portion.

The present inventors reached the finding that eliminating these washers would make it possible to reduce the axial dimension of the reduction gear. Then, the inventors did extended research to find a construction that would limit movement of the cylindrical portion in an axial direction relative to the shaft portion without the need to use washers. The inventors discovered that the bush bearing provided between the shaft portion and cylindrical portion, functioning as a bearing, is able to be used to achieve this purpose. Preferred embodiments of the present invention were made in view of these discoveries.

Preferred embodiments of the present invention will be described below with reference to the drawings. The same or corresponding elements and features are labeled with the same characters in the drawings and their description will not be repeated.

Referring to FIG. 1, an electric-motor-assisted bicycle 10 according to a preferred embodiment of the present invention will be described. FIG. 1 is a schematic right-side view of the electric-motor-assisted bicycle 10.

In the following description, the directions "front/forward", "rear (ward)", "left", "right", "top/upward" and "bottom/downward" mean directions as perceived by a rider sitting on the saddle 18 of the electric-motor-assisted bicycle 10. In the drawings referred to in the following description, arrow "F" indicates the forward direction with respect to the vehicle; arrow "U" indicates the upward direction with respect to the vehicle; arrow "L" indicates the left direction with respect to the vehicle; and arrow "R" indicates the right direction with respect to the vehicle.

The electric-motor-assisted bicycle 10 includes a vehicle-body frame 12, a front wheel 14F, a rear wheel 14R, handlebars 16, a saddle 18, a drive unit 20, and a battery 26.

The vehicle-body frame 12 includes a head tube 121, a top tube 122, a down tube 123, a seat tube 124 and a bracket 125.

The head tube 121 is located at the front of the vehicle-body frame 12 and extends in a top/bottom direction. A stem 27 is inserted into the head tube 121 such that the stem is rotatable. Handlebars 16 are fixed to the top end of the stem 27. A front fork 28 is fixed to the bottom end of the stem 27. The front wheel 14F is rotatably attached to the bottom end of the front fork 28. That is, the front wheel 14F is supported by the vehicle-body frame 12 with the stem 27 and front fork 28 provided in between.

The top tube 122 is located rearward of the head tube 121 and extends in the front/rear direction. The front end of the top tube 122 is connected to the head tube 121. The rear end of the top tube 122 is connected to the seat tube 124.

The down tube 123 is located rearward of the head tube 121 and extends in the front/rear direction. The down tube 123 is located below the top tube 122. The front end of the down tube 123 is connected to the head tube 121. In the present preferred embodiment, the front end of the down tube 123 is also connected to the front end of the top tube 122. The rear end of the down tube 123 is connected to the bracket 125.

The battery 26 is attached to the down tube 123. The battery 26 supplies the drive unit 20 with electric power. The battery 26 includes a battery and a controller. The battery is a chargeable/dischargeable battery, for example. The controller of the battery 26 is configured or programmed to control the battery to be charged or discharged, and to monitor battery output current, remaining battery level, and other parameters.

The seat tube 124 is located rearward of the top tube 122 and down tube 123 and extends in the top/bottom direction. The bottom end of the seat tube 124 is connected to the bracket 125. In other words, the seat tube 124 extends upwardly from the bracket 125.

The seat tube 124 is bent at the center, or substantially at the center, as measured in the top/bottom direction. As such, the lower portion of the seat tube 124 extends in the top/bottom direction while the upper portion of the seat tube 124 extends in a direction angled relative to the top/bottom direction, for example.

The seat post 29 is inserted into the seat tube 124. The saddle 18 is attached to the top end of the seat post 29.

The bracket 125 is located at the bottom of the vehicle-body frame 12. The bracket 125 supports the drive unit 20. Preferably, the drive unit 20 generates driving forces to be transmitted to the rear wheel 14R which is located rearward of the front wheel 14F. The drive unit 20 will be described in detail further below.

The vehicle-body frame 12 further includes a swing arm 30, a pair of connecting arms 303 and a suspension 304. The swing arm 30 includes a pair of chain stays 301 and a pair of seat stays 302.

The chain stays 301 extend in the front/rear direction. The chain stays 301 are arranged in the left/right direction. The rear wheel 14R is located between the chain stays 301. Preferably, the chain stays 301 are positioned to be mirror images of each other. In view of this, only the right chain stay 301 is shown in FIG. 1.

The front end of each of the chain stays 301 is attached to the bracket 125. That is, the chain stays 301 extend rearwardly from the bracket 125. The chain stays 301 are positioned such that they are able to swing relative to the bracket 125 about an axis that extends in the left/right direction.

The axle 141 of the rear wheel 14R is attached to the rear ends of the chain stays 301 such that the axle cannot rotate. That is, the rear wheel 14R is supported on the chain stays 301 such that the rear wheel is able to rotate about the axle 141. In short, the rear wheel 14R is supported by the vehicle-body frame 12. A multi-stage driven sprocket 32 is fixed to the rear wheel 14R.

The seat stays 302 extend in the front/rear direction. The seat stays 302 are arranged in the left/right direction. The rear wheel 14R is located between the seat stays 302. Preferably, the seat stays 302 are positioned to be mirror images of each other. In view of this, only the right seat stay 302 is shown in FIG. 1.

The rear end of the left seat stay 302 is connected to the rear end of the left chain stay 301. The rear end of the right seat stay 302 is connected to the rear end of the right chain stay 301.

The connecting arms 303 extend in the front/rear direction. The connecting arms 303 are arranged in the left/right direction. The seat tube 124 is located between the connecting arms 303. Preferably, the connecting arms 303 are positioned to be mirror images of each other. In view of this, only the right connecting arm 303 is shown in FIG. 1.

The connecting arms 303 are attached to the seat tube 124. The connecting arms 303 are positioned to be able to swing relative to the seat tube 124 about an axis that extends in the left/right direction.

As viewed from a side of the vehicle, the front ends of the connecting arms 303 are located forward of the seat tube 124. As viewed from a side of the vehicle, the rear ends of the connecting arms 303 are located rearward of the seat tube 124.

The rear end of the left connecting arm 303 is attached to the front end of the left seat stay 302. The left connecting arm 303 is positioned to be able to swing relative to the left seat stay 302 about an axis that extends in the left/right direction.

The rear end of the right connecting arm 303 is attached to the front end of the right seat stay 302. The right connecting arm 303 is positioned to be able to swing relative to the right seat stay 302 about an axis that extends in the left/right direction.

The suspension 304 is located forward of the seat tube 124 and rearward of the down tube 123. The top end of the suspension 304 is attached to the connecting arms 303. The suspension 304 is positioned to be able to swing relative to the connecting arms 303 about an axis that extends in the left/right direction. The bottom end of the suspension 304 is attached to the bracket 125. The suspension 304 is positioned to be able to swing relative to the bracket 125 about an axis that extends in the left/right direction. The suspension 304 is attached to the bracket 125 at a position that is forward of the position at which the seat tube 124 is attached to the bracket 125.

A driving sprocket 34 is attached to the drive unit 20 with a support 33 provided in between. A chain 36 is wound about the driving sprocket 34 and driven sprocket 32.

Figure 2:
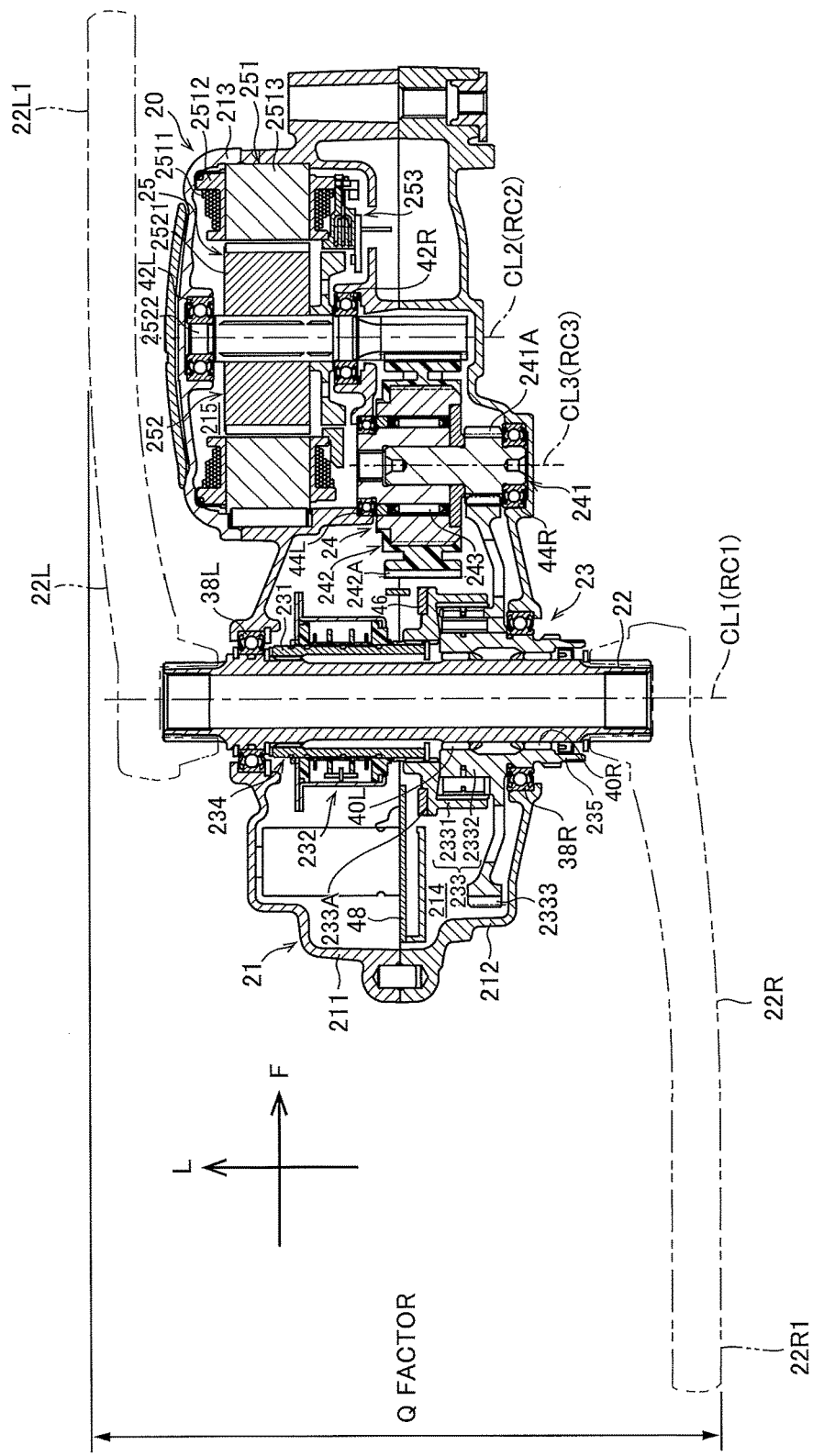
FIG. 2 is a cross-sectional view of the internal construction of a drive unit included in the electric-motor-assisted bicycle shown in FIG. 1.

The drive unit 20 will be described with reference to FIG. 2. FIG. 2 is a vertical cross-sectional view of the internal construction of the drive unit 20.

The drive unit 20 includes a housing 21, a crank axle 22, a rotatable shaft 23, a reduction gear 24 and a motor 25.

The housing 21 is fixed to the bracket 125 by a plurality of fasteners. The housing 21 includes a housing member 211, a housing member 212 and a cover 213. The housing members 211 and 212 and cover 213 are made of a metal material. The metal material may be an aluminum alloy, for example.

The housing member 211 is laid over the housing member 212 from the left as measured in the left/right direction. Then, the housing member 211 is fixed to the housing member 212 by a plurality of fasteners. As a result, a space 214 is defined by the housing members 211 and 212.

The cover 213 is laid over the housing member 211 from the left as measured in the left/right direction. Then, the cover 213 is fixed to the housing member 211 by a plurality of fasteners. As a result, a space 215 is defined by the cover 213 outside the housing member 211 (i.e., to the left thereof).

The crank axle 22 extends through the housing 21 in the left/right direction. That is, the central axis CL1 of the crank axle 22 extends in the left/right direction. The central axis CL1 provides the rotational center RC1 of the crank axle 22 as viewed in an axial direction of the crank axle 22.

A bore extends through the crank axle 22 in the axial direction of the crank axle 22. That is, the crank axle 22 is cylindrical or substantially cylindrical.

The crank axle 22 is supported on the housing 21 such that the crank axle is able to rotate relative to the housing about the central axis CL1 of the crank axle 22. A bearing 38L that rotatably supports the crank axle 22 is fixed to the housing member 211. A bearing 38R, which rotatably supports the crank axle 22 with the driven member 2332 of the one-way clutch 233 described further below and the slide bearings 40L and 40R provided in between, is fixed to the housing member 212.

The crank axle 22 extends through the rotatable shaft 23. The rotatable shaft 23 is housed in the housing 21. The rotatable shaft 23 will be described in detail further below.

A pair of crank arms 22L and 22R, to the left and right, are attached to the crank axle 22. The crank arms 22L and 22R are separated (e.g., spaced away from each other) in the axial direction of the crank axle 22.

The left crank arm 22L is attached to the left end (i.e., one end in the axial direction) of the crank axle 22. In this state, the crank arm 22L extends outwardly in a radial direction of the crank axle 22.

The crank arm 22L includes a pedal attachment portion 22L1. The pedal attachment portion 22L1 is located on the end of the crank arm 22L opposite to the end to which the crank axle 22 is attached. The left pedal is attached to the pedal attachment portion 22L1.

The right crank arm 22R is attached to the right end (i.e., the other end in the axial direction) of the crank axle 22. In this state, the crank arm 22R extends outwardly in a radial direction of the crank axle 22. The crank arm 22R extends in the direction opposite to that of the crank arm 22L.

The crank arm 22R includes a pedal attachment portion 22R1. The pedal attachment portion 22R1 is located on the end of the crank arm 22R opposite to the end to which the crank axle 22 is attached. The right pedal is attached to the pedal attachment portion 22R1.

Figure 3:
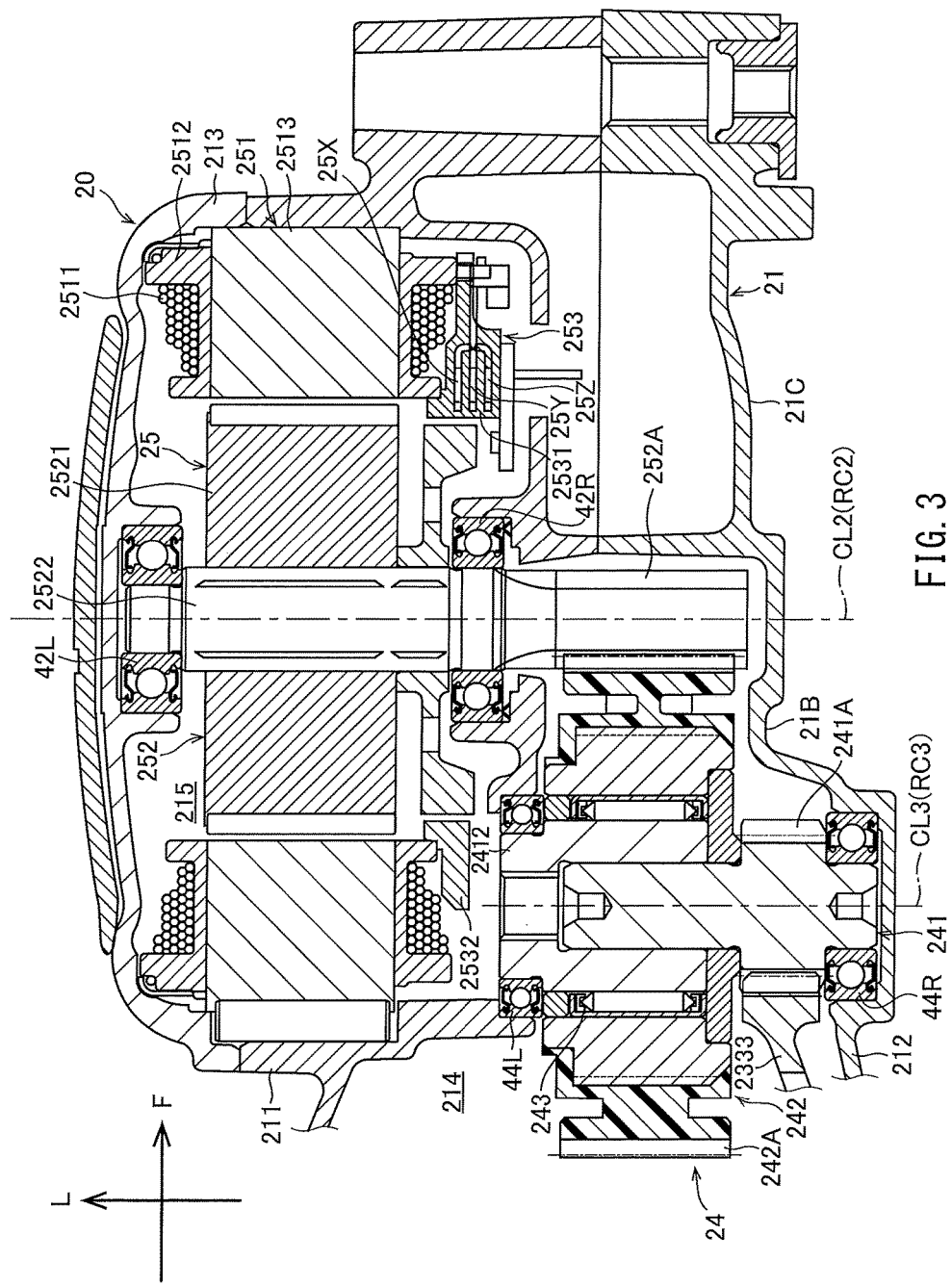
FIG. 3 is an enlarged cross-sectional view of a portion of FIG. 2.

The motor 25 and reduction gear 24 will be described with reference to FIG. 3. FIG. 3 is an enlarged cross-sectional view of a portion of FIG. 2.

The motor 25 is housed in the housing 21. The motor 25 generates driving forces that assist the rider in propelling the electric-motor-assisted bicycle 10. The motor 25 includes a stator 251 and a rotor 252.

The stator 251 includes a plurality of bobbins 2512 (e.g., 14 bobbins in the present preferred embodiment) around which coils 2511 are wound. An iron core 2513 is inserted into the bobbins 2512. The stator 251 is located within the space 215. The stator 251 is fixed to the housing member 211.

A support 253 is attached to the stator 251. The support 253 is made of a synthetic resin, for example. A plurality of bus bars 25X, 25Y and 25Z are embedded in the support 253. Each of the bus bars 25X, 25Y and 25Z is connected to a corresponding coil 2511. Controlling the supply of electricity to the bus bars 25X, 25Y and 25Z enables generation of magnetic fields in the stator 251.

The support 253 is annular or substantially annular. The support 253 is located closer to the housing member 212 than the stator 251 is as measured in the axial direction of the rotor 252.

The support 253 includes an embedment portion 2531 in which the bus bars 25X, 25Y and 25Z are embedded and a non-embedment portion 2532 in which the bus bars 25X, 25Y and 25Z are not embedded. The non-embedment portion 2532 has a smaller thickness than the embedment portion 2531. The right end surface of the non-embedment portion 2532, in the axial direction, is located closer to the stator 251 than the right end surface of the embedment portion 2531, in the axial direction.

The rotor 252 is located inside the stator 251. The central axis CL2 of the rotor 252 is parallel or substantially parallel to the central axis CL1 of the crank axle 22. That is, the rotor 252 is positioned parallel or substantially parallel to the crank axle 22. The central axis CL2 provides the rotational center RC2 of the rotor 252 as viewed in an axial direction of the crank axle 22.

The rotor 252 includes a rotor body 2521 and an output shaft 2522.

The outer periphery of the rotor body 2521 is magnetized to include N- and S-poles arranged alternately in the circumferential direction. In the present preferred embodiment, seven N-poles and seven S-poles are provided, for example.

The output shaft 2522 extends through the rotor body 2521. The output shaft 2522 is fixed to the rotor body 2521. That is, the output shaft 2522 rotates together with the rotor body 2521.

The output shaft 2522 is supported by two bearings 42L and 42R such that the output shaft is able to rotate relative to the housing 21 about the central axis CL2. The bearing 42L is fixed to the cover 213. The bearing 42R is fixed to the housing member 211 to be located to the right of the rotor body 2521 (i.e., further in a second axial direction).

The output shaft 2522 extends through the housing member 211. An output gear 252A is provided on the portions of the output shaft 2522 that are located within the space 214. The output gear 252A is a helical gear.

The reduction gear 24 is housed in the housing 21. More specifically, the reduction gear 24 is located within the space 214. The reduction gear 24 is located to overlap portions of the motor 25 as viewed in an axial direction of the crank axle 22.

A portion of the reduction gear 24 overlaps the motor 25 as viewed in an axial direction of the crank shaft 22. A portion of the reduction gear 24 overlaps the non-embedment portion 2532 of the support 253 as viewed in an axial direction of the crank axle 22.

The central axis CL3 of the reduction gear 24 (i.e., central axis CL3 of the rotational shaft 241) is parallel or substantially parallel to the central axis CL1 of the crank axle 22. That is, the reduction gear 24 is positioned parallel or substantially parallel to the crank axle 22. The central axis CL3 provides the rotational center RC3 of the reduction gear 24 as viewed in an axial direction of the crank axle 22. The rotational center RC3 overlaps the stator 251 as viewed in an axial direction of the crank axle 22.

Preferably, the reduction gear 24 is supported on the housing 21 by two bearing 44L and 44R so as to be rotatable around the central axis CL3. The bearing 44L is press-fitted to the left end of the cylindrical portion 2412 of the reduction gear 24 and then clearance-fitted to the housing member 211. The bearing 44R is press-fitted to the housing member 212.

Figure 4:
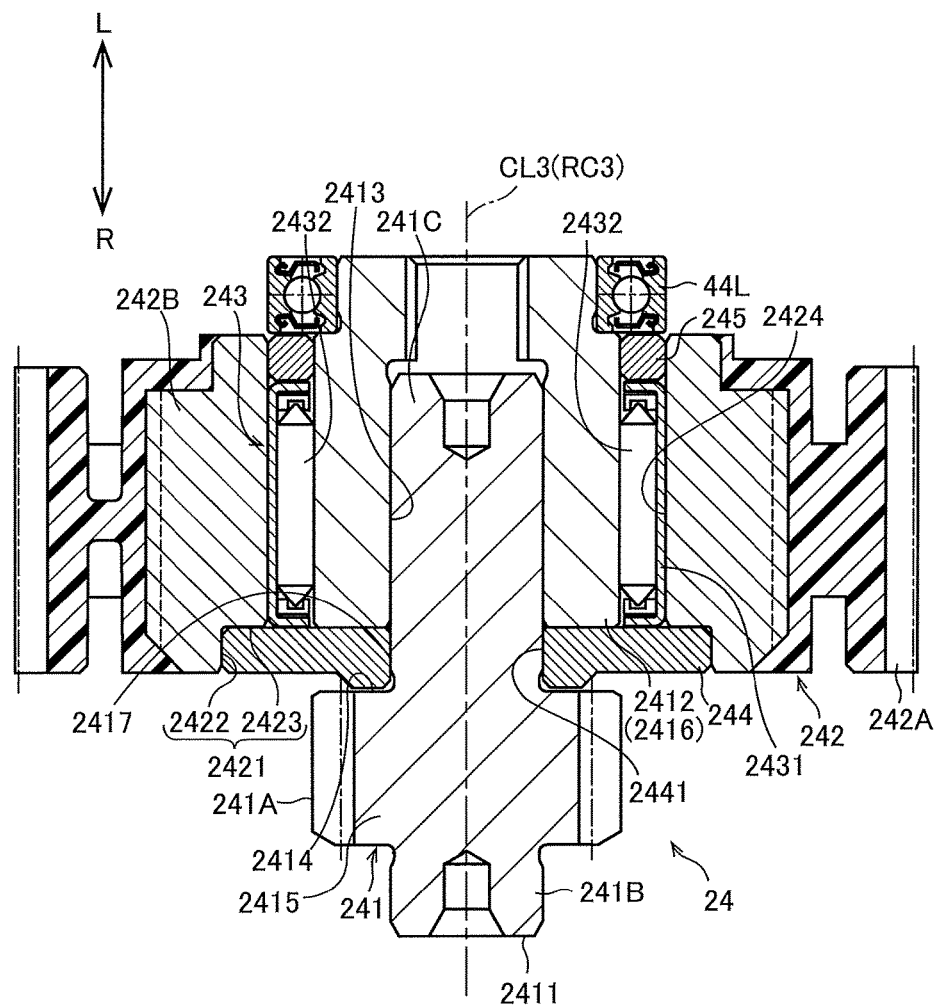
FIG. 4 is a cross-sectional view of a reduction gear.

The reduction gear 24 will be described in detail with reference to FIG. 4. FIG. 4 is across-sectional view of the reduction gear 24. The reduction gear 24 includes a rotatable shaft 241, a cylindrical portion 242, a one-way clutch 243, a bush bearing 244, and a bush bearing 245. The cylindrical portion 242 is positioned by the bush bearings 244 and 245 so as to be coaxial with the rotatable shaft 241.

The rotatable shaft 241 includes a shaft portion 2411 and a cylindrical portion 2412.

The shaft portion 2411 includes a gear 241A. The shaft portion 2411 includes a sub-shaft portion 241B and a sub-shaft portion 241C.

In the axial direction of the shaft portion 2411, the sub-shaft portion 241B is located to the right of (i.e., farther in the second axial direction than) the gear 241A. The sub-shaft portion 241B is connected to the gear 241A such that the sub-shaft portion and gear are arranged in the axial direction of the shaft portion 2411. The sub-shaft portion 241B is clearance-fitted to the bearing 44R (see FIG. 3).

In the axial direction of the shaft portion 2411, the sub-shaft portion 241C is located to the left of (i.e., farther in a first axial direction than) the gear 241A. The sub-shaft portion 241C is connected to the gear 241A such that the sub-shaft portion and gear are arranged in the axial direction of the shaft portion 2411. Preferably, the sub-shaft portion 241C is press-fitted into the cylindrical portion 2412. Thus, the shaft portion 2411 rotates together with the cylindrical portion 2412.

The sub-shaft portion 241C has the same or substantially the same diameter as the sub-shaft portion 241B. Each of the sub-shaft portions 241B and 241C extends straight in the axial direction of the shaft portion 2411 with a constant or substantially constant diameter. Each of the sub-shaft portions 241B and 241C has a smaller diameter than the gear 241A. That is, the gear 241A has a larger diameter than the sub-shaft portions 241B and 241C.

The cylindrical portion 2412 is cylindrical or substantially cylindrical. The cylindrical portion 2412 includes a bore 2413. The cylindrical portion 2412 extends straight in the axial direction of the cylindrical portion 2412 with constant or substantially constant inner and outer diameters.

The sub-shaft portion 241C is press-fitted into the cylindrical portion 2412. In this state, the gear 241A is located outward (i.e., to the right) of the cylindrical portion 2412 in the axial direction of the shaft portion 2411.

The bearing 44L is press-fitted to the left end of the cylindrical portion 2412. In the present preferred embodiment, the left end of the cylindrical portion 2412, i.e., the portion of the cylindrical portion 2412 that is press-fitted to the bearing 44L, has a smaller outer diameter than the other portions thereof.

The cylindrical portion 2412 will be further described with reference to FIG. 3. The left end of the cylindrical portion 2412 is located outward of the inner periphery of the support 253 in radial directions of the rotor 252 as viewed in an axial direction of the cylindrical portion 2412. A portion of the left end of the cylindrical portion 2412 overlaps the non-embedment portion 2532 of the support 253 as viewed in an axial direction of the cylindrical portion 2412.

Returning to FIG. 4, the cylindrical portion 242 is cylindrical or substantially cylindrical in shape. The cylindrical portion 242 includes a base 242B and a gear 242A. These features will be described below.

The base 242B is made of a metal, for example. The base 242B includes a bore 2424. The bore 2424 extends straight in the axial direction of the cylindrical portion 242 with a constant or substantially constant diameter.

The gear 242A is made of a synthetic resin, for example. The gear 242A is located outward of the base 242B in radial directions of the cylindrical portion 242. Preferably, the gear 242A and base 242B are insert-molded. That is, the gear 242 is integral with the base 242B.

The gear 242A engages the output gear 252A (see FIG. 3, for example). That is, the gear 242A is a helical gear.

The gear 242A has a larger diameter than the output gear 252A and has a larger number of teeth than the output gear 252A. That is, the rotational speed of the gear 242A is lower than that of the output gear 252A.

The rotatable shaft 241 is inserted into the cylindrical portion 242 including this structure. In this state, the cylindrical portion 242 is located around the cylindrical portion 2412. Further, the rotatable shaft 241 is coaxial with the cylindrical portion 242. Thus, when the rotatable shaft 241 is inserted into the cylindrical portion 242, the gear 241A is located outward (i.e., to the right) of the cylindrical portion 242 in the axial direction of the rotatable shaft 241.

The one-way clutch 243 is a known shell-shaped one-way clutch, for example. In the one-way clutch 243, a plurality of needle rollers 2432 are disposed in a shell-shaped outer wheel 2431. The one-way clutch 243 is located between the rotatable shaft 241 (more particularly, cylindrical portion 2412) and cylindrical portion 242 (more particularly, base 242B) in radial directions of the rotatable shaft 241. In this state, the shell-shaped outer wheel 2431 of the one-way clutch 243 is press-fitted to the base 242B.

As the one-way clutch 243 is disposed in this manner, when the rotor 252 rotates in the positive direction, the rotatable shaft 241 rotates together with the cylindrical portion 242. That is, driving forces from the motor 25 are transmitted to the gear 2333 via the reduction gear 24. Further, when the motor 24 is stationary and the gear 2333 rotates in the forward direction (i.e., in a direction associated with the advancement of the vehicle), the rotatable shaft 241 rotates relative to the cylindrical portion 242. That is, rotation of the gear 2333 is not transmitted to the rotor 252.

The bush bearing 244 is annular plate shaped or substantially annular plate shaped. A bore 2441 is included in the bush bearing 244. The bore 2441 extends through the bush bearing 244 in the thickness direction (i.e., left-to-right direction). The bore 2441 extends in the thickness direction of the bush bearing 244, straight in the axial direction of the bush bearing 244 with a constant or substantially constant inner diameter.

The sub-shaft portion 241C extends through the bush bearing 244. The sub-shaft portion 241C extends through the bush bearing 244 and then press-fitted into the cylindrical portion 2412. The bush bearing 244 is located between the gear 241A and cylindrical portion 2412 in the axial direction of the rotatable shaft 241. The bush bearing 244 is coaxial with the rotatable shaft 241.

The bore 2441 of the bush bearing 244 has a smaller diameter than the outer diameter of the gear 241A and smaller than the outer diameter of the cylindrical portion 2412. Thus, the bush bearing 244 overlaps the gear 241A and cylindrical portion 2412 as viewed in an axial direction of the rotatable shaft 241.

The bore 2441 of the bush bearing 244 is slidable in a circumferential direction relative to the outer periphery of the sub-shaft portion 241C. Further, in the axial direction of the rotatable shaft 241, a small gap is provided between the bush bearing 244 and an end surface 2414 of the portion of the rotatable shaft that includes the gear 241A, and a small gap is provided between the bush bearing 244 and an end surface of the cylindrical portion 2412. That is, the inner periphery of the bush bearing 244 is able to slide in a circumferential direction of the rotatable shaft 241 and move in an axial direction of the rotatable shaft 241 by the small gap (e.g., towards or away from the small gap). The small gaps are provided in the axial direction of the rotatable shaft 241 in order to enable the rotatable shaft 241 and the cylindrical portion 242 to rotate relative to each other using the one-way clutch 243.

The bush bearing 244 is located between the rotatable shaft 241 (more particularly, sub-shaft portion 241C) and the cylindrical portion 242 in radial directions of the rotatable shaft 241. In the axial direction of the rotatable shaft 241, the bush bearing 244 is located to the right of (i.e., farther in the second axial direction than) the one-way clutch 243. The bush bearing 244 prevents or significantly reduces the one-way clutch 243 from slipping out to the right in the axial direction of the rotatable shaft 241 (i.e., in the second axial direction).

The bush bearing 244 is press-fitted to the base 242B of the cylindrical portion 242. More specifically, the outer periphery of the bush bearing 244 is press-fitted into a recess 2421 provided on the inner periphery of the right end of the base 242B. Thus, the bush bearing 244 rotates together with the cylindrical portion 242.

The recess 2421 includes an inner periphery 2422 and an end surface 2423.

The inner periphery 2422 is tubular or substantially tubular in shape. The inner periphery 2422 extends straight in the axial direction of the cylindrical portion 242 with a constant or substantially constant inner diameter.

The end surface 2423 is annular or substantially annular. The end surface 2423 is connected to the left end of the inner periphery 2422 (i.e., furthermost position thereon in the first axial direction). The outer diameter of the end surface 2423 is equal or substantially equal to the diameter of the inner periphery 2422. The end surface 2423 is connected to the inner periphery of the base 242B. That is, the inner diameter of the end surface 2423 is equal to or substantially equal to the diameter of the bore 2424 of the base 242B.

The outer periphery of the bush bearing 244 is press-fitted to the inner periphery 2422 of the recess 2421. That is, the outer periphery of the bush bearing 244 is fixed to the cylindrical portion 242. In other words, the outer periphery of the bush bearing 244 is prevented from moving in axial and circumferential directions relative to the cylindrical portion 242. When the outer periphery of the bush bearing 244 is press-fitted to the inner periphery 2422 of the recess 2421, the left end surface of the bush bearing 244 (i.e., furthermost position thereon in the first axial direction) is in contact with the end surface 2423 of the recess 2421.

The bush bearing 245 is ring shaped or substantially ring shaped, for example. That is, the bush bearing 245 includes an inner periphery and an outer periphery. The inner and outer peripheries of the bush bearing 245 extend straight in the thickness direction of the bush bearing 245 (i.e., axial direction of bush bearing 245), each with a constant or substantially constant diameter.

The bush bearing 245 is located between the rotatable shaft 241 (more particularly, cylindrical portion 2412) and cylindrical portion 242 in radial directions of the rotatable shaft 241. In the axial direction of the rotatable shaft 241, the bush bearing 245 is located to the left of (i.e., further in the first axial direction than) the one-way clutch 243. The bush bearing 245 prevents or significantly reduces the one-way clutch 243 from slipping out to the left in the axial direction of the rotatable shaft 241 (i.e., in the first axial direction).

The bush bearing 245 is press-fitted to the base 242B of the cylindrical portion 242. That is, the outer periphery of the bush bearing 245 is fixed to the base 242B. In other words, the bush bearing 245 rotates together with the base 242B.

The rotatable shaft 241 (more particularly, cylindrical portion 2412) extends through the bush bearing 245. The inner periphery of the bush bearing 245 is slidable in a circumferential direction relative to the outer periphery of the rotatable shaft 241 (more particularly, cylindrical portion 2412).

As will be clear from the above description, according to a preferred embodiment of the present invention, the portion of the rotatable shaft 241 that includes the gear 241A includes the first large-diameter portion 2415. The cylindrical portion 2412 of the rotatable shaft 241 includes the second large-diameter portion 2416. The portion of the sub-shaft portion 241C of the rotatable shaft 241 that is not in the cylindrical portion 2412 (that is, portion in the bush bearing 244) includes the small-diameter portion 2417.

Figure 5:
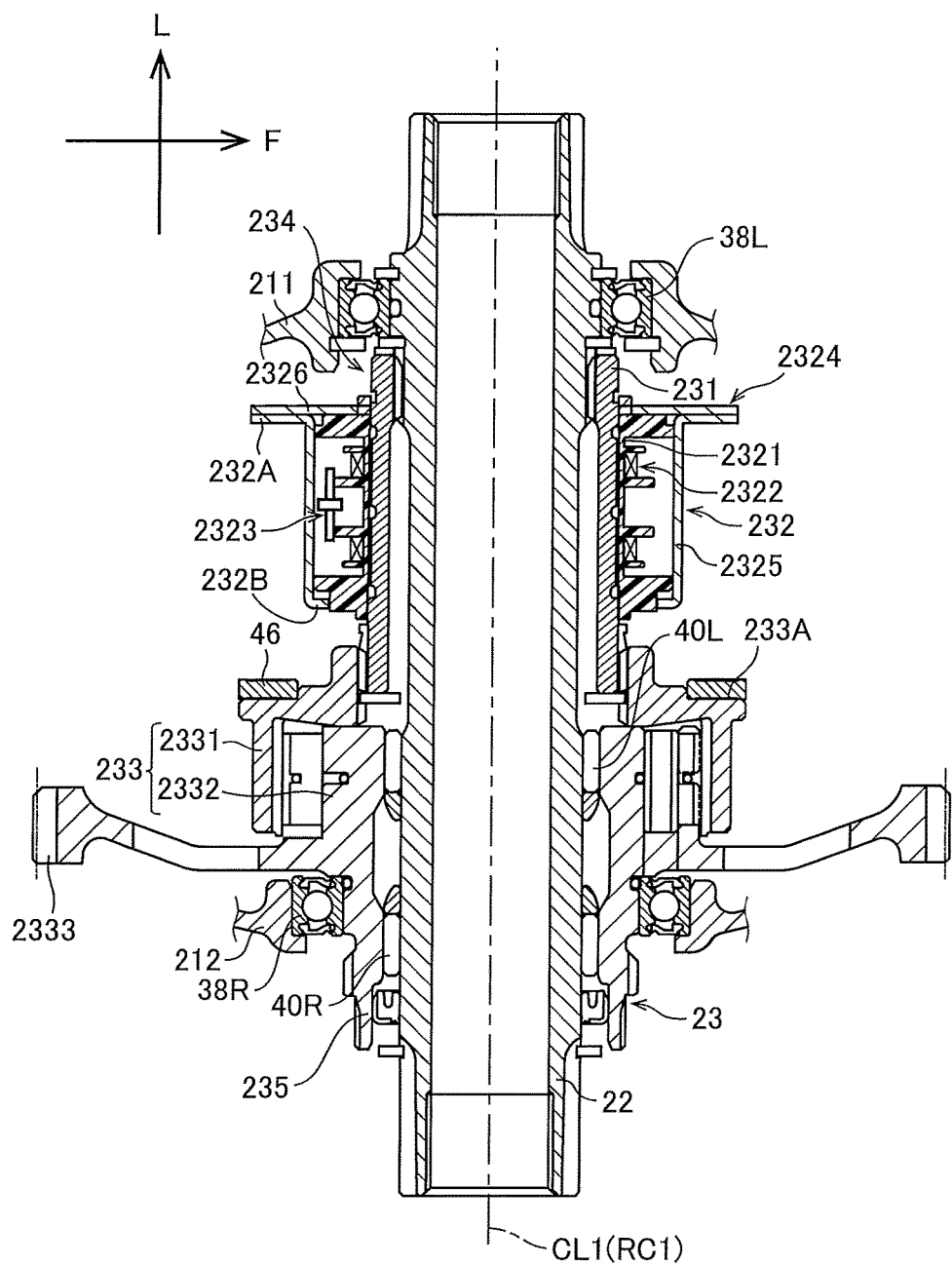
FIG. 5 is an enlarged cross-sectional view of another portion of FIG. 2.

The rotatable shaft 23 will be described with reference to FIG. 5. FIG. 5 is an enlarged vertical cross-sectional view of another portion of FIG. 2.

The rotatable shaft 23 is positioned coaxially with the crank axle 22 and is able to rotate together with the crank axle 22. The crank axle 23 includes a coupling shaft 231 and a one-way clutch 233.

The coupling shaft 231 has a cylindrical or substantially cylindrical shape. The crank axle 22 is inserted into the coupling shaft 231. The coupling shaft 231 is positioned coaxially with the crank axle 22.

The left end of the coupling shaft 231 (i.e., furthermost position thereon in the first axial direction) is coupled with the crank axle 22 by spline coupling or the like. As such, the coupling shaft 231 rotates together with the crank axle 22 regardless of whether the crank axle 22 rotates in the forward or rearward direction.

A torque detector 232 is provided around the coupling shaft 231. The torque detector 232 is supported on the housing member 211.

The torque detector 232 detects torque generated in the coupling shaft 231 when the rider pedals. The torque detector 232 preferably is a known magnetostrictive torque sensor, for example. The torque detector 232 is disposed around the coupling shaft 231. The torque detector 232 provides a signal associated with the detected torque to a controller mounted on a substrate 48, for example. The controller is configured or programmed to refer to the signal associated with the torque detected by the torque detector 232 in order to recognize the state of the bicycle in terms of the pedaling by the rider, and to control the motor 25.

The torque detector 232 includes a bobbin 2321, a coil 2322, a detector 2323 and a shield 2324.

The bobbin 2321 is cylindrical or substantially cylindrical. The coupling shaft 231 extends through the bobbin 2321. The both ends of the bobbin 2321 in the axial direction are in slidable contact with the outer periphery of the coupling shaft 231. The intermediate portion of the bobbin 2321 in the axial direction is adjacent to the outer periphery of the coupling shaft 231 with a slight gap provided in between. The bobbin 2321 is rotatable relative to the coupling shaft 231. That is, the bobbin 2321 does not rotate together with the coupling shaft 231.

The coil 2322 is wound around the outer periphery of the bobbin 2321. Preferably, a predetermined voltage is applied to the coil 2322.

The detector 2323 detects changes in the voltage across the coil 2322 caused by distortions of the coupling shaft 231. Thus, the torque produced in the coupling shaft 231, i.e., the torque produced in the crank axle 22 as it rotates together with the coupling shaft 231 is detected.

The shield 2324 prevents or significantly reduces the detection precision of the detector 2323 (i.e., precision with which changes in the voltage across the coil 2322 are detected) from being decreased by external magnetic fields. The shield 2324 engages the stop 236 (see, for example, FIG. 6) provided on the housing 21 (more particularly, housing member 211). Therefore, the shield 2324 does not rotate together with the coupling shaft 231.

The shield 2324 includes a shield 2325 and a shield 2326.

The shield 2325 is cylindrical or substantially cylindrical. The bobbin 2321 is held inside the shield 2325.

A flange 232A is provided on the left end of the shield 2325 (i.e., furthermost position thereon in the first axial direction). The flange 232A extends from the shield 2325 outwardly in radial directions of the shield 2325. A flange 232B is provided on the right end of the shield 2325 (i.e., furthermost position thereon in the second axial direction). The flange 232B extends from the shield 2325 inwardly in radial directions of the shield 2325.

The shield 2326 is annular or substantially annular. The shield 2326 overlaps the flange 232A of the shield 2325 such that the shield 2326 and flange 232A are arranged in the axial direction of the shield 2325. Further, the shield 2326 is fixed to the flange 232A. The shield 2326 is fixed to the flange 232A by screwing or welding, for example.

The one-way clutch 233 is located closer to the housing member 212 than the torque detector 232 is as measured in the axial direction of the crank axle 22. The one-way clutch 233 is positioned coaxially with the crank axle 22.

The one-way clutch 233 includes a driver 2331 and a driven member 2332.

The driver 2331 has a cylindrical or substantially cylindrical shape. The right end of the coupling shaft 231 (i.e., furthermost position thereon in the second axial direction) is inserted into the left end of the driver 2331 (i.e., furthermost position thereon in the first axial direction). The driver 2331 is positioned coaxially with the coupling shaft 231. The right end of the coupling shaft 231 (i.e., furthermost position thereon in the second axial direction) is coupled with the left end of the driver 2331 (i.e., furthermost position thereon in the first axial direction) by spline coupling or the like. As a result, the driver 2331 rotates together with the coupling shaft 231 regardless of whether the coupling shaft 231 rotates in the forward or rearward direction. That is, the driver 2331 rotates together with the crank axle 22 regardless of whether the crank axle 22 rotates in the forward or rearward direction. The coupling shaft 231 and driver 2331 define and function as a crank rotation input shaft 234 that rotates in an integral manner with the crank axle 22.

An annular attachment surface 233A is provided as a portion of the outer periphery of the driver 2331. The attachment surface 233A expands radially with respect to the driver 2331 and extends in the circumferential direction. The attachment surface 233A is located toward the right of (i.e., further in the second axial direction than) the left end of the driver 2331 (i.e., furthermost position thereon in the first axial direction). The attachment surface 233A is positioned to overlap a portion of the substrate 48 as viewed in an axial direction of the crank axle 22.

A ring magnet 46 is fixed to the attachment surface 233A. The ring magnet 46 overlaps the driver 2331 as viewed in an axial direction of the crank axle 22. The ring magnet 46 overlaps a portion of the substrate 48 as viewed in an axial direction of the crank axle 22.

The ring magnet 46 rotates together with the driver 2331. Thus, as the detector 48A (e.g., a detector)(see FIG. 6) is used to detect changes in the magnetic field caused by the rotation of the ring magnet 46, the rotation of the driver 2331 (and thus that of the crank axle 22) is detected. That is, the rotation detector includes the ring magnet 46 and detector 48A.

The detector 48A (see FIG. 6) is mounted on the substrate 48. The detector 48A is positioned to face the ring magnet 46 such that the detector 48A and magnet are arranged in the axial direction of the crank axle 22.

The driven member 2332 has a cylindrical or substantially cylindrical shape. The crank axle 22 is inserted into the driven member 2332. Slide bearings 40L and 40R are provided between the driven member 2332 and crank axle 22. Thus, the driven member 2322 is positioned to be coaxial with, and able to rotate relative to, the crank axle 22.

The left end of the driven member 2332 (i.e., furthermost position thereon in the first axial direction) is inserted into the right end of the driver 2331 (i.e., furthermost position thereon in the second axial direction). A ratchet is provided between the left end of the driven member 2332 (i.e., furthermost position thereon in the first axial direction) and the right end of the driver 2331 (i.e., furthermost position thereon in the second axial direction) to define and function as the one-way clutch. Thus, rotational forces of the driver 2331 in the forward direction are transmitted to the driven member 2332, while rotational forces of the driver 2331 in the rearward direction are not transmitted to the driven member 2332.

The driven member 2332 is supported by the bearing 38R fixed to the housing member 212 such that the driven member is able to rotate relative to the housing 21 about the central axis CL1 of the crank axle 22.

The driven member 2332 extends through the housing member 212. The driving sprocket 34 (see FIG. 1) is attached, by the support 33 (see FIG. 1, for example), to the portions of the driven member 2332 that are located outward (i.e., to the right) of the housing 21.

The driven member 2332 includes a gear 2333. The gear 2333 engages the gear 241 of the reduction gear 24. The gear 2333 has a larger diameter than the gear 241A and includes more teeth than the gear 241A. That is, the rotational speed of the gear 2333 is lower than the rotational speed of the gear 241A.

The driven member 2332 includes a resultant-force output shaft 235 that provides the resultant of a human-generated force provided through the one-way clutch 233 (i.e., pedaling force) and a motor-generated driving force provided through the gear 2333. That is, the resultant-force output shaft 235 is included in the rotatable shaft 23.

Figure 6:
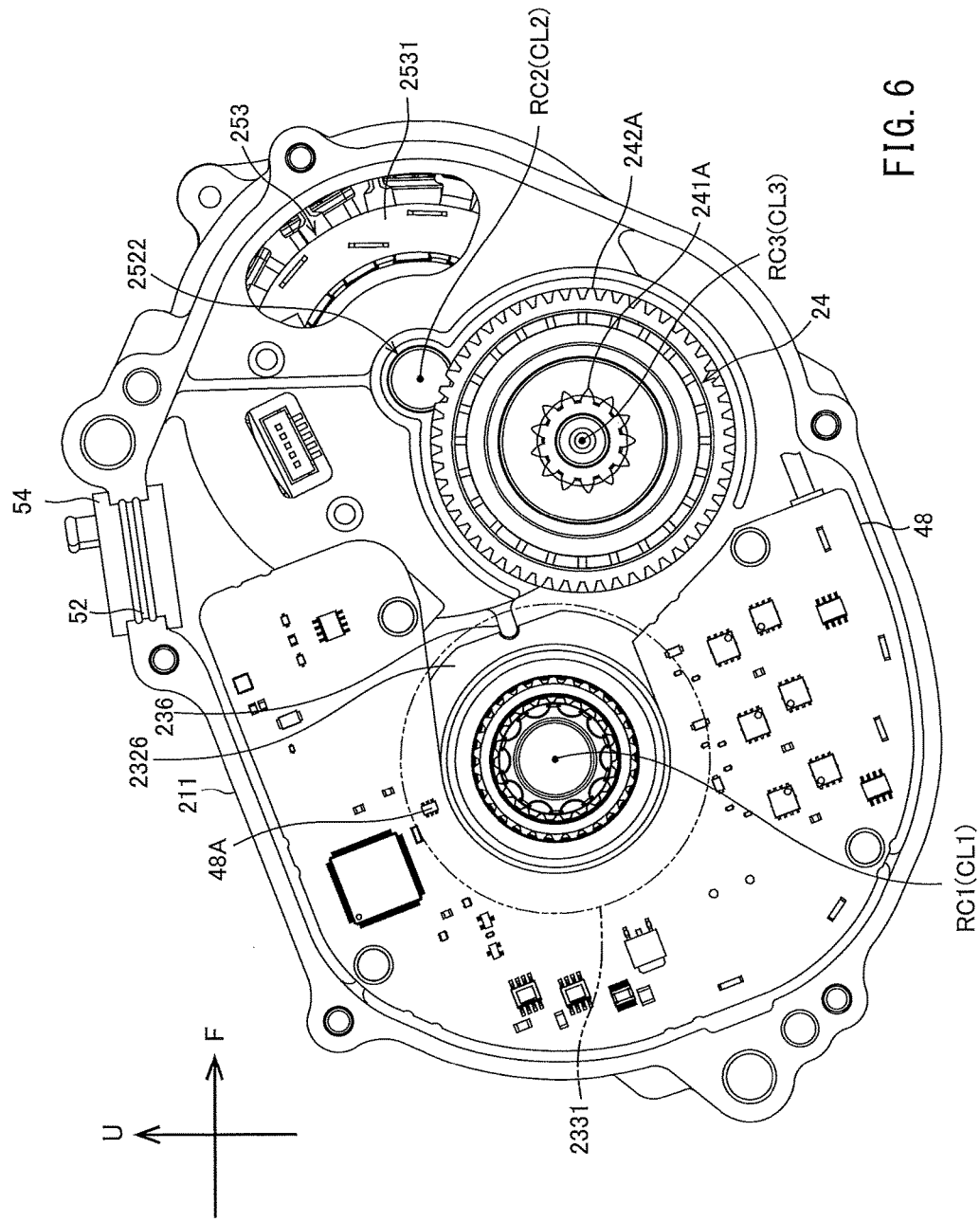
FIG. 6 is a right-side view of the internal construction of the drive unit with the right housing member removed and with the one-way clutch removed.

The substrate 48 in the housing 21 will be described with reference to FIG. 6. FIG. 6 is a right-side view of the internal construction of the drive unit 20 with the housing member 212 removed and with the one-way clutch 233 removed. In FIG. 6, the driver 2331 is suggested by a phantom line.

The substrate 48 controls the power supply to the motor 25. The substrate 48 may include a circuit or circuit element mounted thereon that controls a power supply to the motor 25. The substrate 48 is positioned to surround the crank axle 22 as viewed in an axial direction of the crank axle 22. In the preferred embodiment of the present invention shown in FIG. 6, the substrate 48 preferably is "C-shaped" or substantially "C-shaped" as viewed in an axial direction of the crank axle 22. Preferably, the substrate 48 does not overlap the reduction gear 24 as viewed in an axial direction of the crank axle 22.

An outlet 52 is provided in the housing 21 to enable cables connected to the substrate 48 to be routed out. In a preferred embodiment of the present invention, a grommet 54 is provided on the outlet 52. The grommet 54 includes an elastic body. The grommet 54 is provided to protect the cables connected to the substrate 48 and prevent or significantly reduce dust and water from entering. The cables connected to the substrate 48 are routed out from the drive unit 20 through the grommet 54. The cables connected to the substrate 48 are connected to the battery 26 (see, for example, FIG. 1).

The electric-motor-assisted bicycle 10 includes the drive unit 20, which enables reducing Q Factor. This feature will be described in detail below. Q Factor is the distance between the outer surface of the pedal attachment portion 22L1 and the outer surface of the pedal attachment portion 22R1 as measured in the axial direction of the crank axle 22, as shown in FIG. 2, for example.

In the drive unit 20, the gear 242A of the reduction gear 24 and the output gear 252A of the output shaft 2552 of the motor 25 are helical gears. Accordingly, when a driving force from the motor 25 is transmitted to the reduction gear 24, a thrust force arises between the output shaft 241 and cylindrical portion 242. As a result, the cylindrical portion 242 attempts to move in an axial direction relative to the rotatable shaft 241.

When the cylindrical portion 242 attempts to move from the left to the right (i.e., in the second axial direction), that is, when the cylindrical portion 242 attempts to move toward the housing member 212, the bush bearing 244 slides along the small-diameter portion 2417 in an axial direction and contacts the end surface 2414 of the portion of the rotatable shaft that includes the gear 241A (i.e., the first large-diameter portion 2415). On the other hand, when the cylindrical portion 242 moves from the right to the left (i.e., in the first axial direction), that is, when the cylindrical portion 242 attempts to move away from the housing member 212, the bush bearing 244 slides along the small-diameter portion 2417 in an axial direction and contacts an end surface of the cylindrical portion 2412 (i.e., the second large-diameter portion 2416). That is, the bush bearing 244, which was originally provided to function as a bearing, is able to be effectively used to limit axial movement of the cylindrical portion 242 relative to the rotatable shaft 241. Thus, additional washers that were necessary in conventional drive units to limit axial movement of the cylindrical portion relative to the rotatable shaft do not need to be provided. This enables reducing the axial dimension of the reduction gear 24. If the axial dimension of the reduction gear 24 is reduced, the dimension of the housing 21 containing the reduction gear 24 as measured in the left-to-right direction is able to be reduced. If the dimension of the housing 21 as measured in the left-to-right direction is reduced, the length of the crank axle 22 is able to be reduced. Thus, Q Factor is able to be reduced.

In the drive unit 20, the shaft portion 2411 includes the gear 241A. That is, the gear 241A is integral with the shaft portion 2411, for example. If it is assumed that a portion of the rotatable shaft of the reduction gear is press-fitted into the gear that engages the gear 2333, the diameter of the gear engaging the gear 2333 may be slightly increased by the press fit for some sizes of the gear, which would make it difficult for the gear to engage the gear 2333. Accordingly, according to preferred embodiments of the present invention, the gear 241A and shaft portion 2411 preferably are integral. This will prevent the above-discussed problem.

In the drive unit 20, preferably, the substrate 48 does not overlap the reduction gear 24 as viewed in an axial direction of the crank axle 22. This enables reducing the dimension of the drive unit 20 as measured in the left-to-right direction, thus enabling a reduction in Q Factor. The reasons for this will be explained below.

If it is assumed that the substrate overlaps the reduction gear 24 as viewed in an axial direction of the crank axle 22 such that the substrate must be located at a position different from the reduction gear 24 in the axial direction of the crank axle 22, then the dimension of the housing 21 as measured in the left-to-right direction is increased. On the other hand, according to a preferred embodiment of the present invention, the substrate 48 does not overlap the reduction gear 24 as viewed in an axial direction of the crank axle 22. Thus, the substrate 48 is able to be disposed at the same position as the reduction gear 24 in the axial direction of the crank axle 22 (i.e., to overlap the reduction gear 24 as viewed in a radial direction of the crank axle 22). This enables reducing the dimension of the housing 21 as measured in the left-to-right direction, which enables reducing the dimension of the drive unit 20 as measured in the left-to-right direction, thus enabling reducing Q Factor.

In the drive unit 20, the ring magnet 46 overlaps the driver 2331 as viewed in an axial direction of the crank axle 22. This eliminates the necessity of a member that positions the ring magnet outward of the side (i.e., outer periphery) of the driver in radial directions of the crank axle 22, as would be the case according to JP 2014-196080 A. That is, preferably, there is no member that would represent an obstacle to positioning the reduction gear 24 close or adjacent to the gear 2333 as measured in the axial direction of the crank axle 22. This enables positioning the reduction gear 24 closer to the gear 2333 as measured in the axial direction of the crank axle 22. Since the dimension of the drive unit 20 as measured in the left-to-right direction is able to be reduced, Q Factor is able to be reduced.

In the drive unit 20, a portion of the rotatable shaft 241 (more particularly, the left end of the cylindrical portion 2412, for example) overlaps the non-embedment portion 2532 of the support 253 as viewed in an axial direction of the rotatable shaft 241. This enables positioning the reduction gear 24 closer to the motor 25 (more particularly, the stator 251, for example) as measured in the axial direction of the crank axle 22. As a result, the dimension of the drive unit 20 as measured in the left-to-right direction is able to be reduced, thus enabling reducing Q Factor.

In the drive unit 20, the shield 2326 and flange 232A are located toward the left of (i.e., further in the first axial direction than) the detector 2323. That is, members that fix the shield 2326 and flange 232A (for example, bolts and nuts) are able to be positioned far from the substrate 48. As such, even if the shield 2324 is positioned close or adjacent to the driver 2331 as measured in the axial direction of the crank axle 22, a space in which the substrate 48 is to be positioned is able to be provided.

Further, the shield 2324 is able to be positioned closer to the driver 2331 as measured in the axial direction of the crank axle 22, and the length of the crank axle 22 is able to be reduced. Since the dimension of the drive unit 20 as measured in the left-to-right direction is able to be reduced, Q Factor is able to be reduced.

In the drive unit 20, the substrate 48 is located at the same or substantially the same position as the left end of the driver 2331 in the axial direction of the crank axle 22. As such, the length of the crank axle 22 is able to be reduced. Since the dimension of the drive unit 20 as measured in the left-to-right direction is able to be reduced, Q Factor is able to be reduced.

Figure 7:
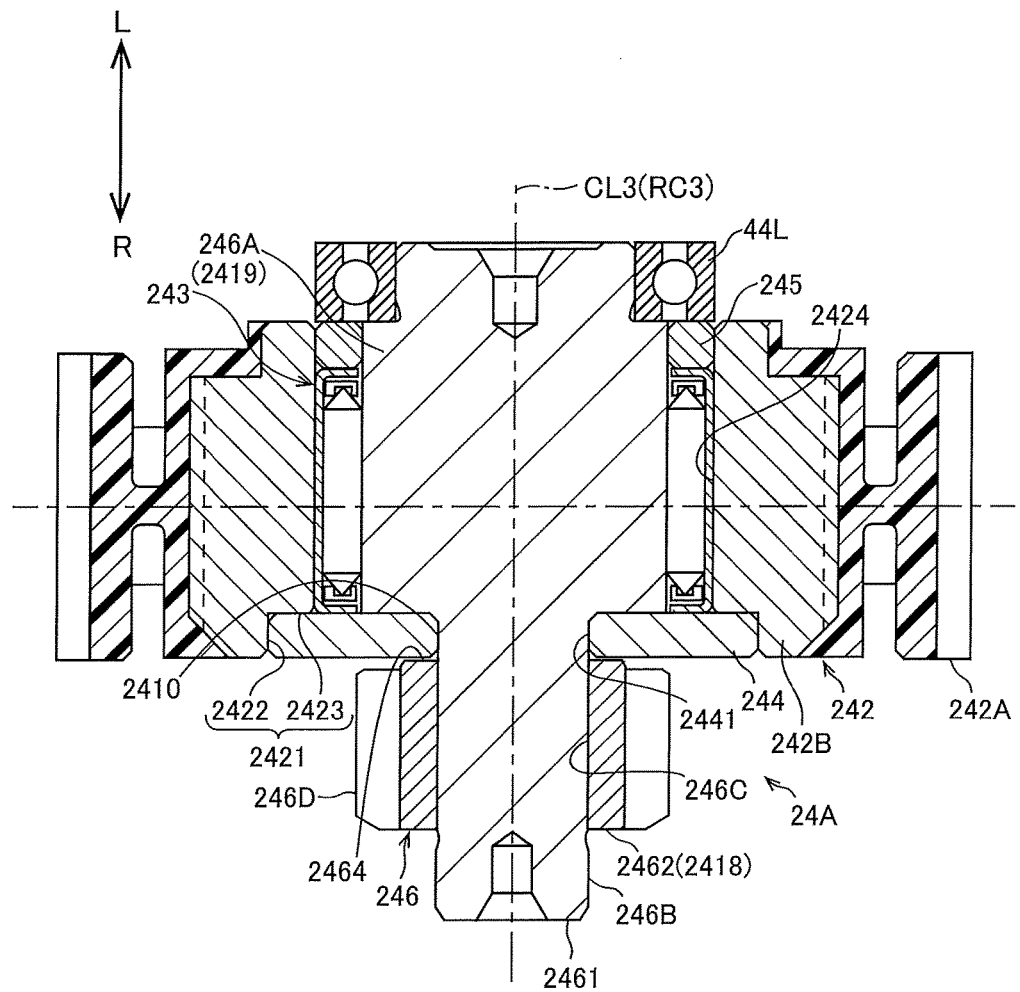
FIG. 7 is a cross-sectional view of an example application of the reduction gear.

The reduction gear 24 of the above-described preferred embodiments of the present invention is able to be replaced by a reduction gear 24A shown in FIG. 7, for example. The reduction gear 24A will be described with reference to FIG. 7.

The reduction gear 24A is different from the reduction gear 24 in that it includes a rotatable shaft 246 instead of the rotatable shaft 241. The rotatable shaft 246 includes a shaft portion 2461 and a cylindrical portion 2462.

The shaft portion 2461 includes a large-diameter portion 246A and a small-diameter portion 246B. The large-diameter portion 246A and small-diameter portion 246B are arranged in the axial direction of the shaft portion 2461. The large-diameter portion 246A is connected to the small-diameter portion 246B such that these portions are arranged in the axial direction of the shaft portion 2461. The large-diameter portion 246A and the small-diameter portion 246B are coaxial. A cylindrical portion 242 is located around the large-diameter portion 246A.

The cylindrical portion 2462 includes a bore 246C. The bore 246C extends straight in the axial direction of the cylindrical portion 2462 with a constant or substantially constant diameter. The cylindrical portion 2462 includes a gear 246C. The gear 246D engages the gear 2333.

The small-diameter portion 246B is press-fitted into the cylindrical portion 2462. Thus, the cylindrical portion 2462 rotates together with the shaft portion 2461.

In the reduction gear 24A, the small-diameter portion 246B extends through the bush bearing 244 before being press-fitted into the cylindrical portion 2462. The bush bearing 244 is located between an end surface of the large-diameter portion 246A and an end surface 2464 of the cylindrical portion 2462 in the axial direction of the rotatable shaft 246.

The bore 2441 of the bush bearing 244 is slidable in a circumferential direction relative to the outer periphery of the small-diameter portion 246B. Further, in the axial direction of the rotatable shaft 246, a small gap is provided between the bush bearing 244 and an end surface of the large-diameter portion 246A and a small gap is provided between the bush bearing 244 and the end surface 2464 of the bearing 2462. That is, the inner periphery of the bush bearing 244 is slidable in a circumferential direction of the rotatable shaft 246 and is able to move in an axial direction of the rotatable shaft 246 by the small gap. As in the reduction gear 24, the outer periphery of the bush bearing 244 is fixed (i.e., press-fitted) to the cylindrical portion 242. The bearing 44L is press-fitted to the left end of the bearing 2461.

As will be apparent from the above description, in the reduction gear 24A, the portion of the rotatable shaft 246 that includes the gear 246D, i.e., cylindrical portion 2462, includes the first large-diameter portion 2418. The large-diameter portion 246A of the rotatable shaft 246 includes the second large-diameter portion 2419. The portion of the small-diameter portion 246B of the rotatable shaft 246 that is in the bush bearing 244 includes the small-diameter portion 2410.

In this reduction gear 24A, the bush bearing 244 is effectively used to limit axial movement of the cylindrical portion 242 relative to the rotatable shaft 246. Thus, the use of the reduction gear 24A will also provide the same or similar advantages as the above-described preferred embodiments of the present invention.

Figure 8:
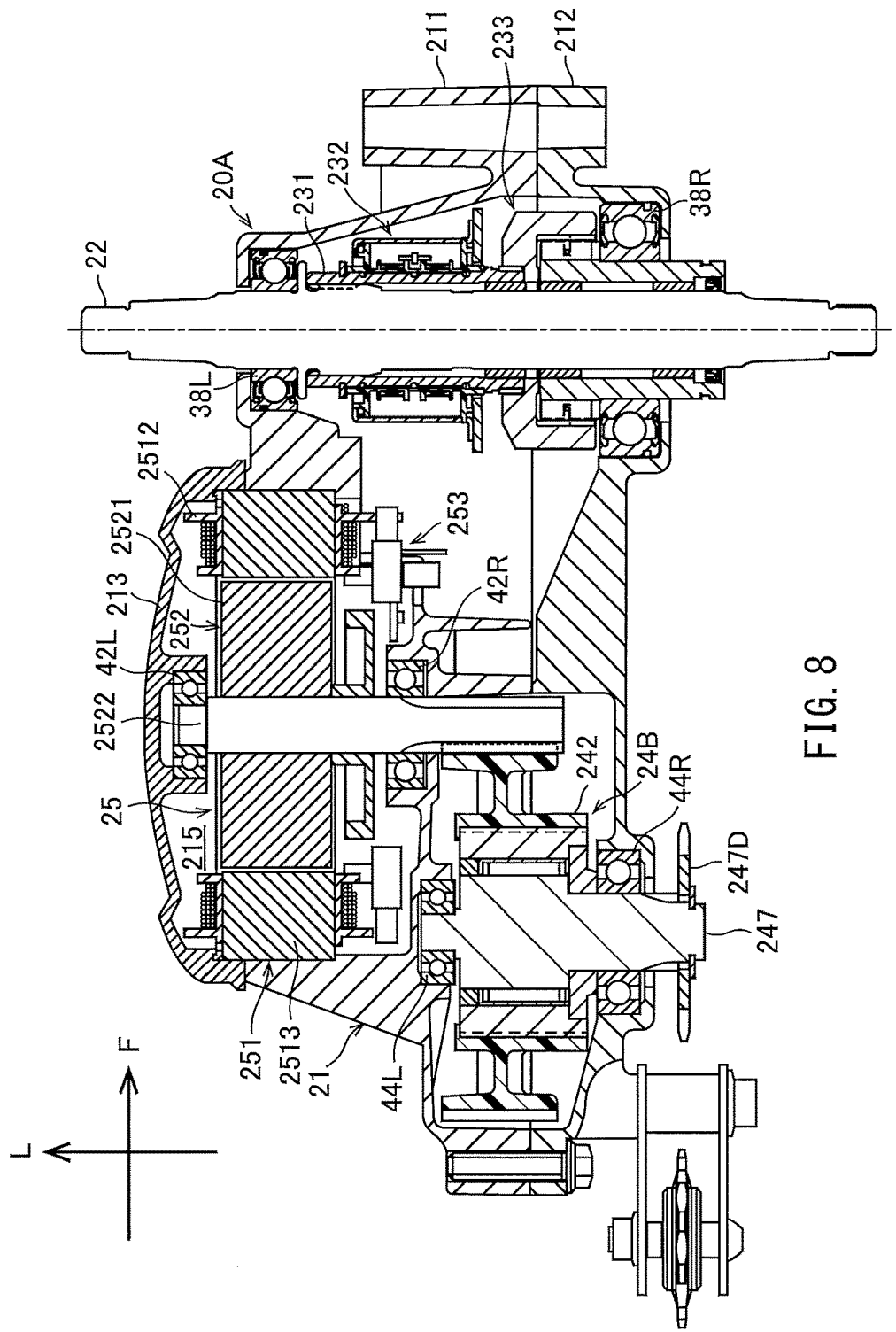
FIG. 8 is a cross-sectional view of an example application of the drive unit.

In the above-described preferred embodiments of the present invention, the drive unit 20 preferably includes the gear 2333. Alternatively, the drive unit may not include the gear 2333. An example of such a preferred embodiment is shown in FIG. 8. The drive unit 20A will be described with reference to FIG. 8.

The drive unit 20A is different from the drive unit 20 in that it does not include the gear 2333. Further, the drive unit 20A is different from the drive unit 20 in that it includes a reduction gear 24B instead of the reduction gear 24.

Figure 9:
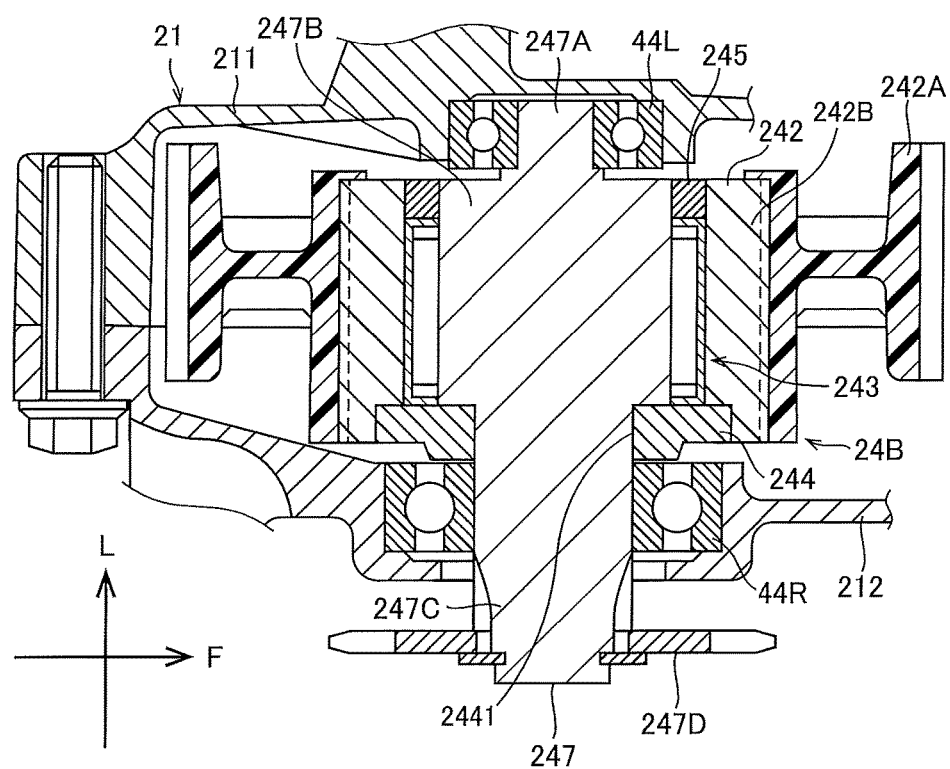
FIG. 9 is an enlarged cross-sectional view of a portion of FIG. 8.

The reduction gear 24B will be described with reference to FIG. 9. FIG. 9 is an enlarged cross-sectional view of a portion of FIG. 8.

The reduction gear 24B is different from the reduction gear 24 in that it includes a rotatable shaft 247 instead of the rotatable shaft 241. The rotatable shaft 247 includes a small-diameter portion 247A, a large-diameter portion 247B, and a small-diameter portion 247C.

The small-diameter portion 247A is connected to the large-diameter portion 247B such that these portions are arranged in the axial direction of the rotatable shaft 247. The small-diameter portion 247A is coaxial with the large-diameter portion 247B. The small-diameter portion 247A has a smaller diameter than the large-diameter portion 247B.

The small-diameter portion 247A is supported on the housing member 211 by a bearing 44L, which has been press-fitted to the small-diameter portion 247A. The bearing 44L is clearance-fitted to the housing member 211. In the present preferred embodiment, the portion of the small-diameter portion 247A at which the rotatable shaft is supported by the bearing 44L has a smaller diameter than the other portions of the rotatable shaft.

The small-diameter portion 247C is located on the side of the large-diameter portion 247B opposite to the small-diameter portion 247A in the axial direction of the rotatable shaft 247. The small-diameter portion 247C is connected to the large-diameter portion 247B such that these portions are arranged in the axial direction of the rotatable shaft 247. The small-diameter portion 247C is coaxial with the large-diameter portion 247B. The small-diameter portion 247C has a smaller diameter than the large-diameter portion 247B. The small-diameter portion 247C has a larger diameter than the small-diameter portion 247A.

The small-diameter portion 247C is rotatably supported on the housing member 211 by a bearing 44R, which has been press-fitted to the small-diameter portion 247C. The bearing 44R is clearance-fitted to the housing member 212. The small-diameter portion 247C extends through the housing member 212. An auxiliary sprocket 247D is fixed to a portion of the small-diameter portion 247C that is located outside (i.e., to the right of) the housing member 212.

A chain 36 is wound around the auxiliary sprocket 247D. A driving force from the motor 25 is transmitted to the chain 36 via the auxiliary sprocket 247D.

The cylindrical portion 242 is located around the large-diameter portion 247B. A one-way clutch 243 is located between the large-diameter portion 247B and cylindrical portion 242.

In the reduction gear 24B, the small-diameter portion 247C extends through the bush bearing 244. The bush bearing 244 is located between the large-diameter portion 247B and bearing 44R in the axial direction of the rotatable shaft 247. As viewed in the axial direction of the rotatable shaft 247, the bush bearing 244 overlaps the large-diameter portion 247B and overlaps the bearing 44R.

The bore 2441 of the bush bearing 244 is slidable in a circumferential direction relative to the outer periphery of the smaller-diameter portion 247C. Further, in the axial direction of the rotatable shaft 247, a small gap is provided between the bush bearing 244 and an end surface of the large-diameter portion 247B and a small gap is provided between the bush bearing 244 and the an end surface of the inner race of the bearing 44R. That is, the inner periphery of the bush bearing 244 is slidable in a circumferential direction of the rotatable shaft 247, and is able to move in an axial direction of the rotatable shaft 247 by the small gap. As in the reduction gear 24, the outer periphery of the bush bearing 244 is fixed (i.e., press-fitted) to the cylindrical portion 242.

In the drive unit 20A including the above-described reduction gear 24B, when a driving force from the motor 25 is transmitted to the reduction gear 24B, a thrust force arises between the rotatable shaft 247 and cylindrical portion 242, as in the drive unit 20. Thus, the cylindrical portion 242 attempts to move in an axial direction relative to the rotatable shaft 247.

When the cylindrical portion 242 is attempting to move from the left to the right (i.e., in the second axial direction), that is, when the cylindrical portion 242 is attempting to move toward the housing member 212, the bush bearing 244 contacts an end surface of the inner race of the bearing 44R. On the other hand, when the cylindrical portion 242 attempts to move from the right to the left (i.e., in the first axial direction), that is, when the cylindrical portion 242 is attempting to move away from the housing member 212, the bush bearing 244 contacts an end surface of the large-diameter portion 247B. That is, the bush bearing 244, which was originally provided to function as a bearing, is able to be effectively used to limit axial movement of the cylindrical portion 242 relative to the rotatable shaft 247. Thus, additional washers that were necessary in conventional drive units to limit axial movement of the cylindrical portion relative to the rotatable shaft do not need to be provided. This enables reducing the axial dimension of the reduction gear 24B. If the axial dimension of the reduction gear 24B is reduced, the dimension of the housing 21 containing the reduction gear 24B as measured in the left-to-right direction is able to be reduced. If the dimension of the housing 21 as measured in the left-to-right direction is reduced, the length of the crank axle 22 is able to be reduced. Thus, Q Factor is able to be reduced.

While preferred embodiments of the present invention have been described, the preferred embodiments of the present invention are merely examples that allow the present invention to be carried out. Thus, the present invention is not limited to these preferred embodiments, and the preferred embodiments may be modified as appropriate without departing from the spirit of the present invention when carried out.

For example, while the above preferred embodiments describe electric-motor-assisted bicycles preferably including suspensions, the present invention is applicable, of course, to electric-motor-assisted bicycles without a suspension.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A drive unit attached to a vehicle-body frame of an electric-motor-assisted bicycle to generate a driving force to be transmitted to a rear wheel, the drive unit comprising:

a housing;
a motor housed in the housing and including a motor output shaft, the motor output shaft including a helical gear provided thereon;
a crank axle extending through the housing in a left-to-right direction of the bicycle;
a crank rotation input shaft, the crank axle extending through the crank rotation input shaft, the crank rotation input shaft including one end coupled to the crank axle;
a resultant-force output shaft, the crank axle extending through the resultant-force output shaft, the resultant-force output shaft being connected to an other end of the crank rotation input shaft with a one-way clutch provided in between; and
a reduction gear housed in the housing, the reduction gear transmitting the driving force from the motor to the resultant-force output shaft; wherein
the reduction gear includes:
 a rotatable shaft positioned parallel or substantially parallel to the crank axle, the rotatable shaft including a driving gear that engages a driven gear included in the resultant-force output shaft;
 a cylindrical portion, the rotatable shaft extending through the cylindrical portion, the cylindrical portion including a helical gear provided thereon that engages the helical gear on the motor output shaft; and
 a one-way clutch located between the rotatable shaft and the cylindrical portion in a radial direction of the rotatable shaft;
the rotatable shaft includes:
 a first large-diameter portion, the driving gear being provided on the first large-diameter portion;
 a small-diameter portion with a smaller diameter than the first large-diameter portion, the small-diameter portion being connected to the first large-diameter portion such that the small-diameter portion and the first large-diameter portion are arranged in an axial direction of the rotatable shaft; and
 a second large-diameter portion with a larger diameter than the small-diameter portion, the second large-diameter portion being connected to the small-diameter portion such that the second large-diameter portion and the small-diameter portion are arranged in the axial direction of the rotatable shaft; and
the reduction gear includes a bush bearing, the bush bearing being disposed between an end surface of the first large-diameter portion and an end surface of the second large-diameter portion in the axial direction of the rotatable shaft, the bush bearing including an outer periphery fixed to the cylindrical portion and an inner periphery that slides in a circumferential direction relative to the small-diameter portion and moves in the axial direction of the rotatable shaft.

2. The drive unit according to claim 1, wherein
the small-diameter portion is integral with one of the first large-diameter portion and the second large-diameter portion; and
a hole is included in the other one of the first large-diameter portion and the second large-diameter portion, and the small-diameter portion is press-fitted into the hole.

3. The drive unit according to claim 1, further comprising:
a substrate including a circuit mounted thereon to control power supply to the motor; wherein the substrate does not overlap the reduction gear as viewed in the axial direction of the rotatable shaft.

4. The drive unit according to claim 3, wherein
the drive unit includes a rotation detector that detects rotation of the crank rotation input shaft;
the crank rotation input shaft includes an attachment surface extending in a radial direction of the crank axle, and the attachment surface does not overlap the substrate as viewed in an axial direction of the crank axle; and
the rotation detector includes:
  a ring magnet provided on the attachment surface; and
  a detector mounted on the substrate and positioned to face the ring magnet such that the detector and the ring magnet are arranged in the axial direction of the crank axle, the detector detecting the rotation of the crank rotation input shaft.

5. An electric-motor-assisted bicycle comprising:
the drive unit according to claim 1.

6. A drive unit attached to a vehicle-body frame of an electric-motor-assisted bicycle to generate a driving force to be transmitted to a rear wheel, the drive unit comprising:
a housing;
a motor housed in the housing and including a motor output shaft, the motor output shaft including a helical gear provided thereon;
a crank axle extending through the housing in a left-to-right direction of the bicycle;
a reduction gear, the driving force from the motor being transmitted to the reduction gear;
a bearing; and
a bush bearing; wherein
the motor output shaft is positioned parallel or substantially parallel to the crank axle;
the reduction gear includes:
  a rotatable shaft positioned parallel or substantially parallel to the motor output shaft, and a sprocket fixed to the rotatable shaft;
  a cylindrical portion, the rotatable shaft extending through the cylindrical portion, the cylindrical portion including a helical gear provided thereon that engages the helical gear on the motor output shaft; and
  a one-way clutch located between the rotatable shaft and the cylindrical portion in a radial direction of the rotatable shaft;
the rotatable shaft includes:
  a small-diameter portion, the sprocket being fixed to the small-diameter portion; and
  a large-diameter portion with a larger diameter than the small-diameter portion, the large-diameter portion being connected to the small-diameter portion such that the large-diameter portion and the small-diameter portion are arranged in an axial direction of the rotatable shaft; wherein
the bearing rotatably supports the small-diameter portion; and
the bush bearing, which is included in the reduction gear, is disposed between an end surface of the large-diameter portion and an end surface of the bearing in the axial direction of the rotatable shaft, the bush bearing includes an outer periphery fixed to the cylindrical portion and an inner periphery that slides in a circumferential direction relative to the small-diameter portion and moves in the axial direction of the rotatable shaft.

* * * * *